United States Patent [19]
Chaplin

[11] 3,878,669
[45] Apr. 22, 1975

[54] MECHANICAL ELIMINATION OF AQUATIC GROWTHS

[76] Inventor: Merle P. Chaplin, 609 Driver Ave., Winter Park, Fla. 32789

[22] Filed: Oct. 2, 1973

[21] Appl. No.: 402,822

Related U.S. Application Data

[62] Division of Ser. No. 364,283, May 29, 1973.

[52] U.S. Cl. .................................. 56/9; 56/DIG. 2
[51] Int. Cl. ............................................. A01d 45/08
[58] Field of Search ....................................... 56/1, 9

[56] References Cited
UNITED STATES PATENTS

| | | | |
|---|---|---|---|
| 1,795,003 | 3/1931 | Allen | 56/9 |
| 3,468,106 | 9/1969 | Myers et al. | 56/9 |

Primary Examiner—Russell R. Kinsey
Attorney, Agent, or Firm—Edwin E. Greigg

[57] ABSTRACT

Apparatus and method for eliminating upstanding, floating and other aquatic growths from lakes, rivers and streams, including much of their root structure, comprising mechanically moving the upstanding and floating aquatic growths generally downward to a zone automatically controlled as to its position relative to the root structure of the growths, where suction is applied to draw the growths and roots through a cutting zone where the growths and roots are cut into short pieces, and into a vacuum chamber where entrained air and growths juices are removed from their stems and leaves, and the growths structure collapsed. The cut and collapsed growths and roots may then be subjected to a second cutting operation, with or without pressure, to further destroy their growth identity, and reduce the growths and roots to a finely divided inert mass, which may then be spread as a blanket on the water bottom from which the growths and roots were originally removed, or delivered to a remote location.

6 Claims, 43 Drawing Figures

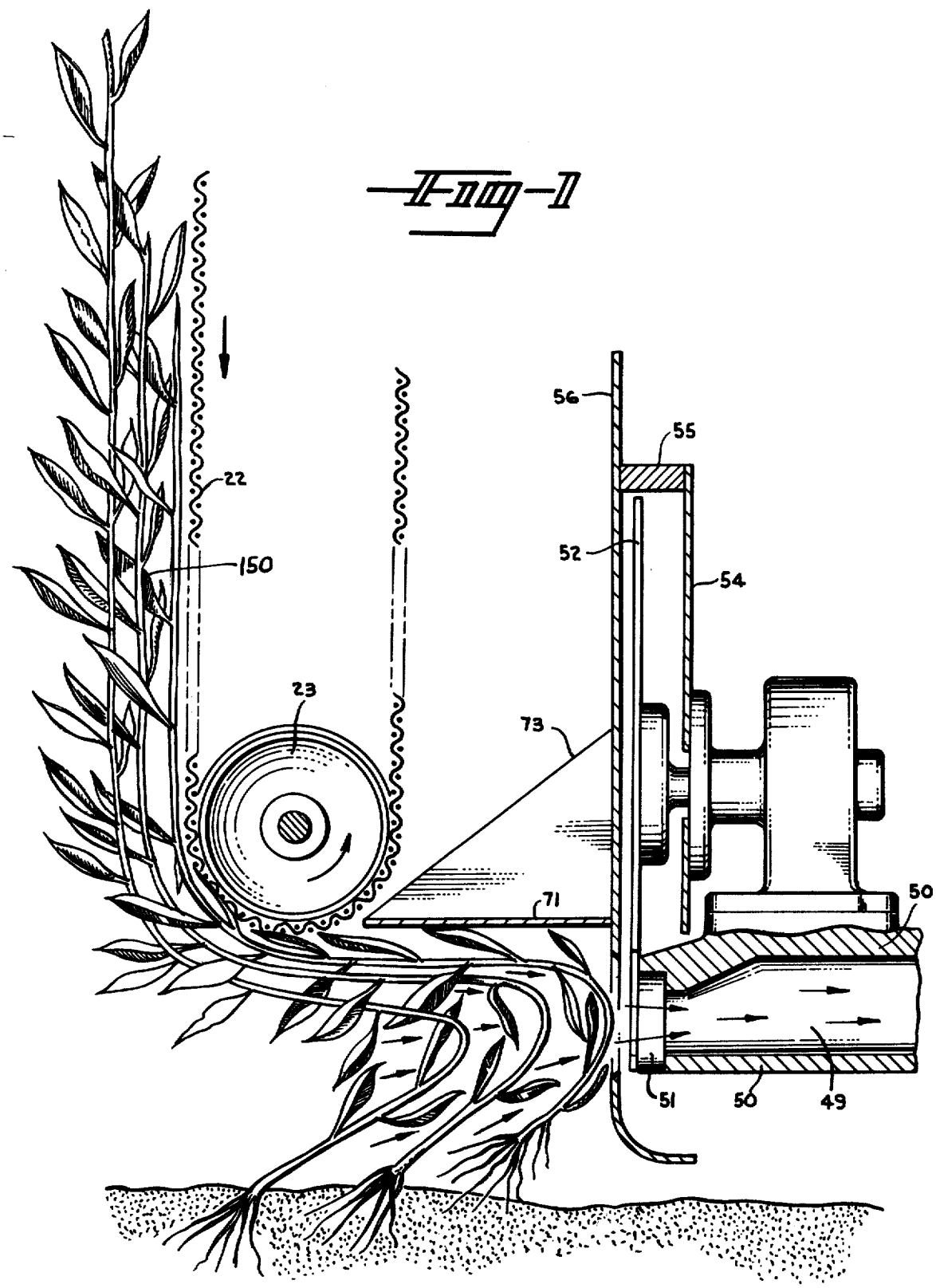

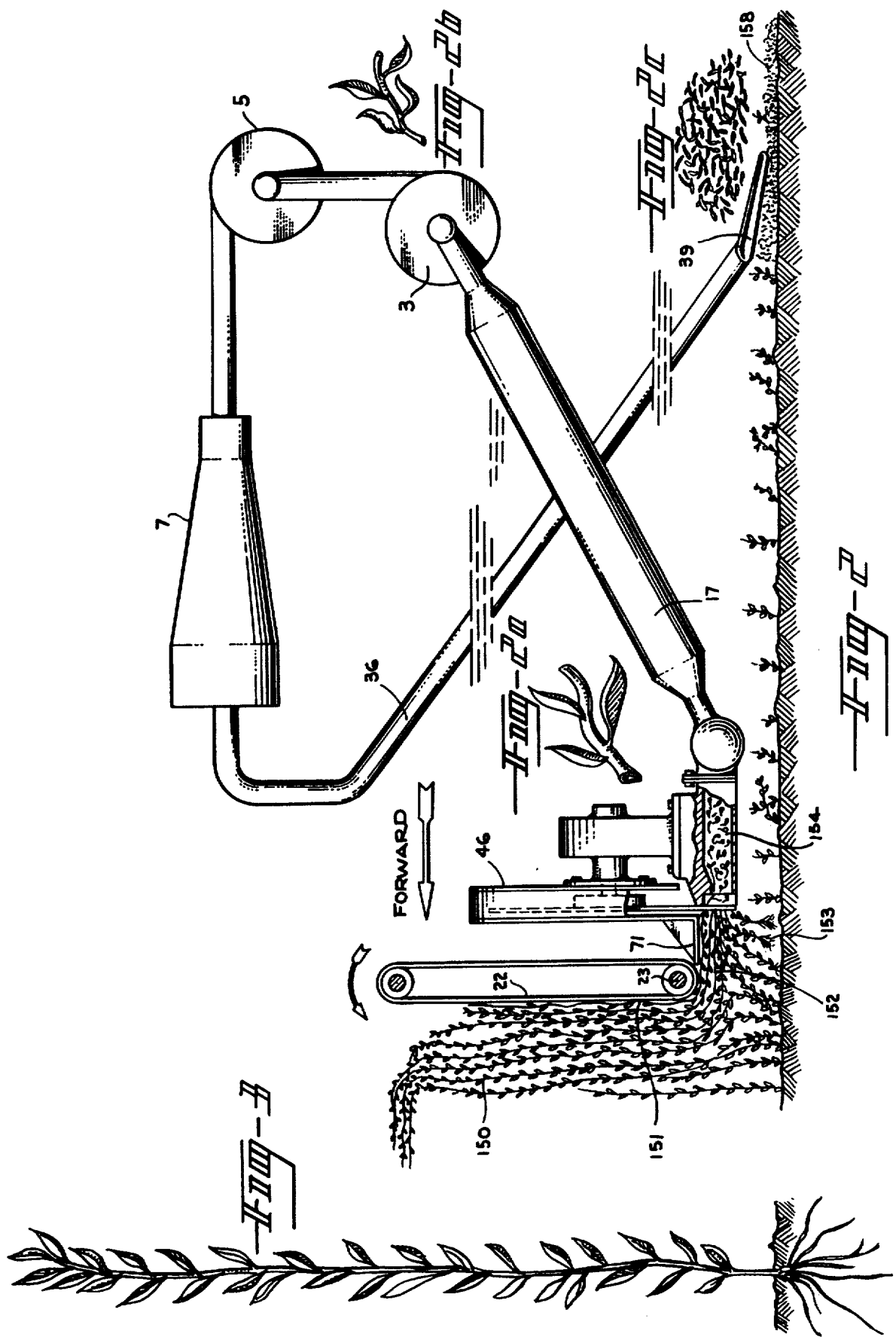

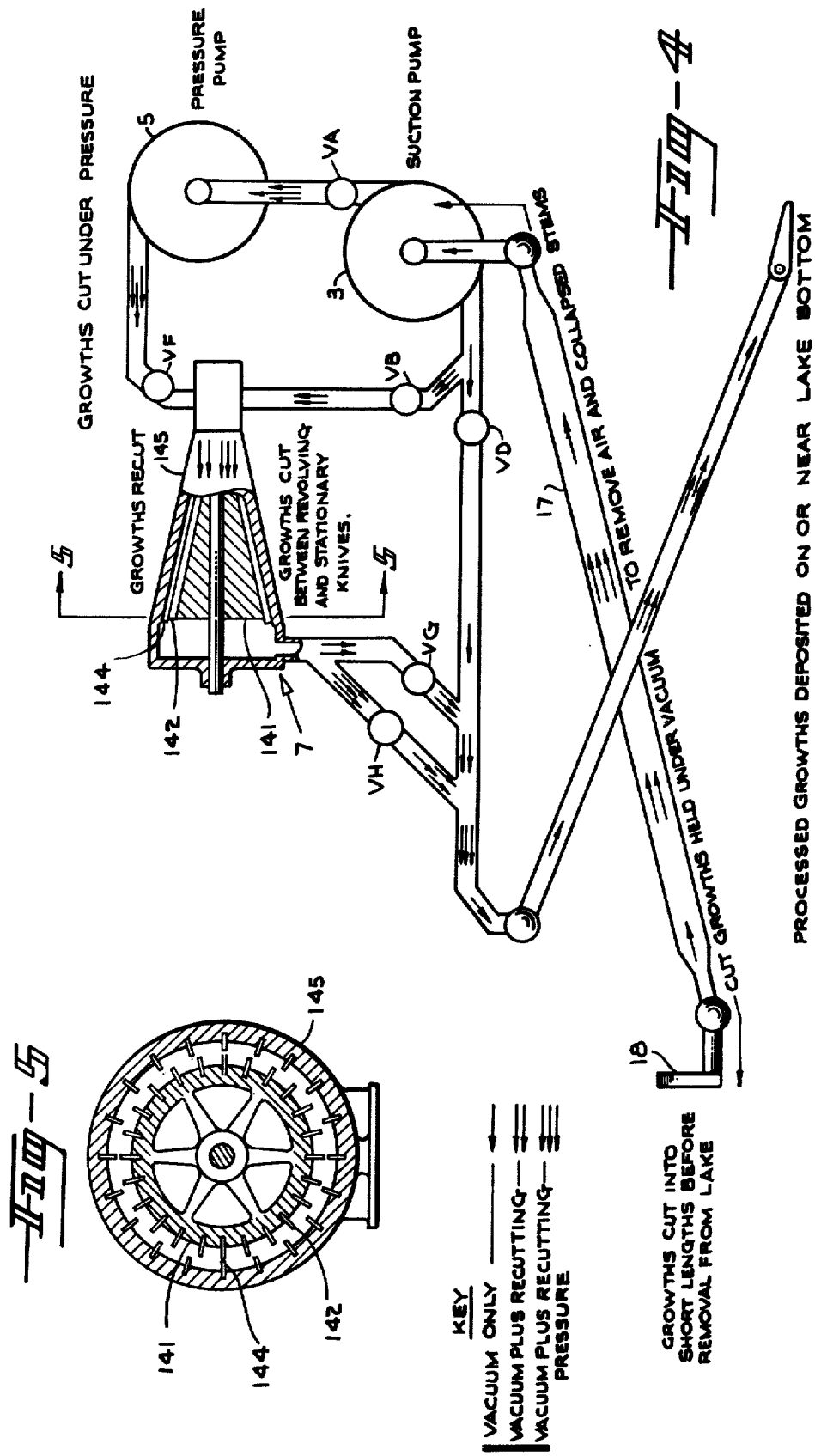

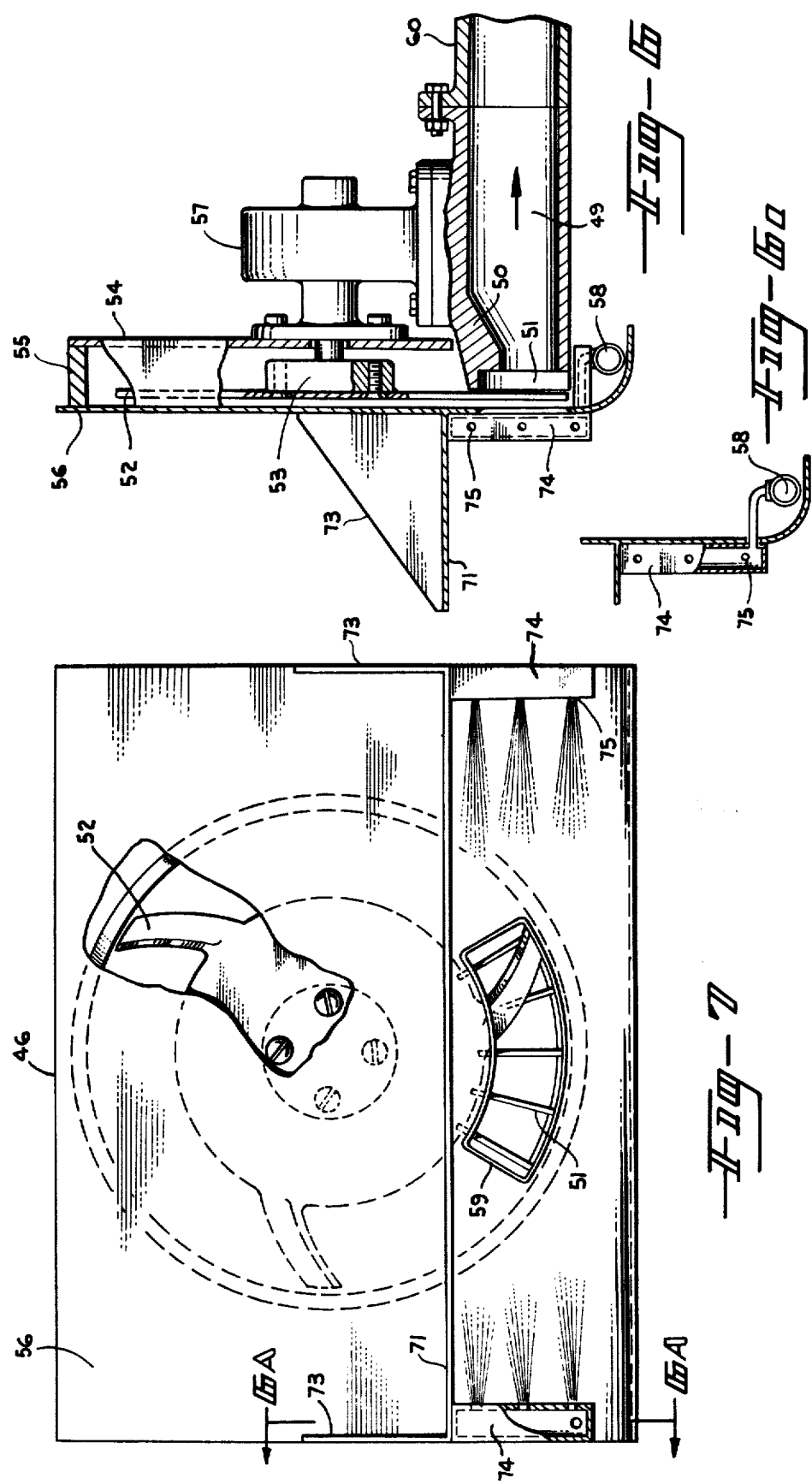

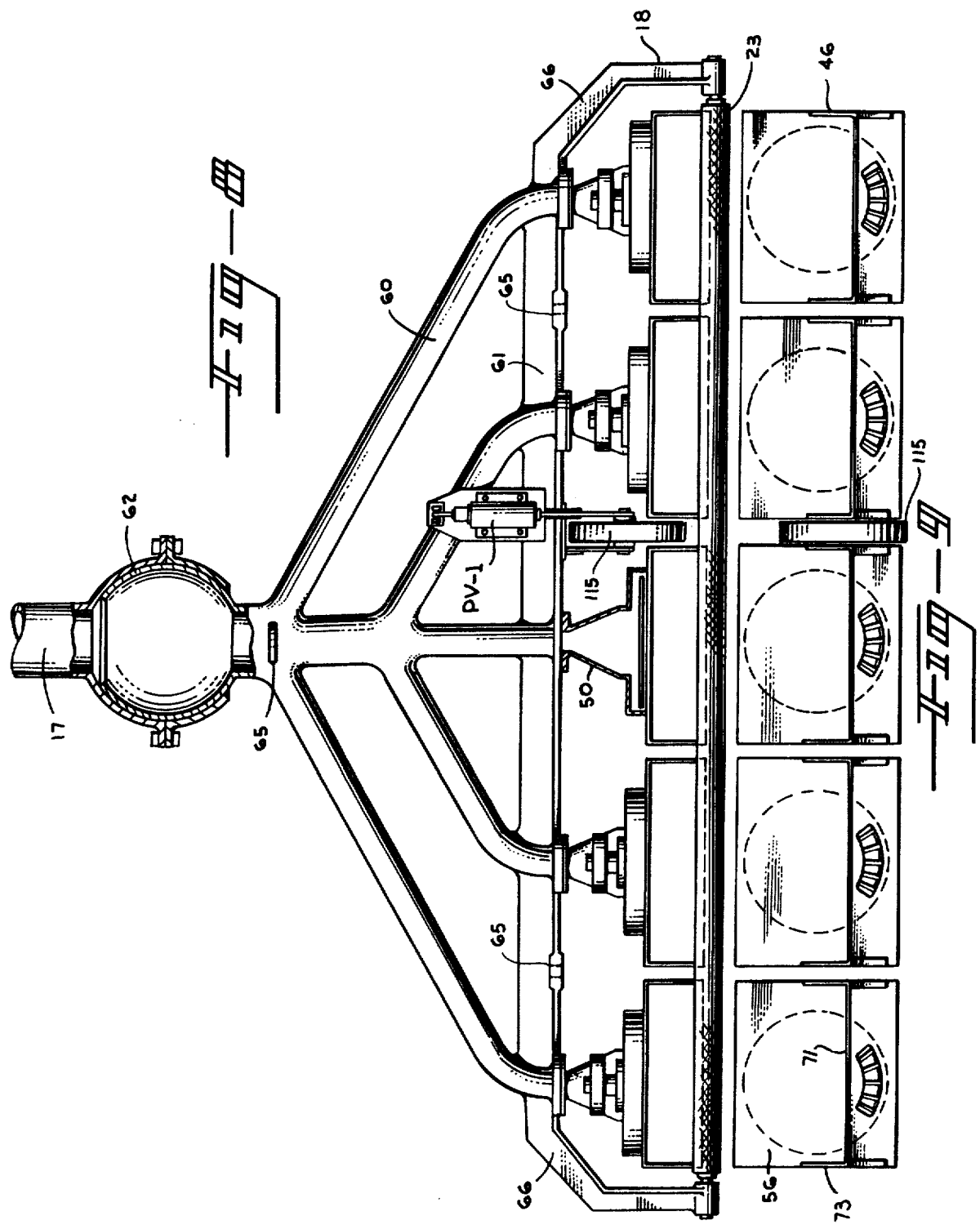

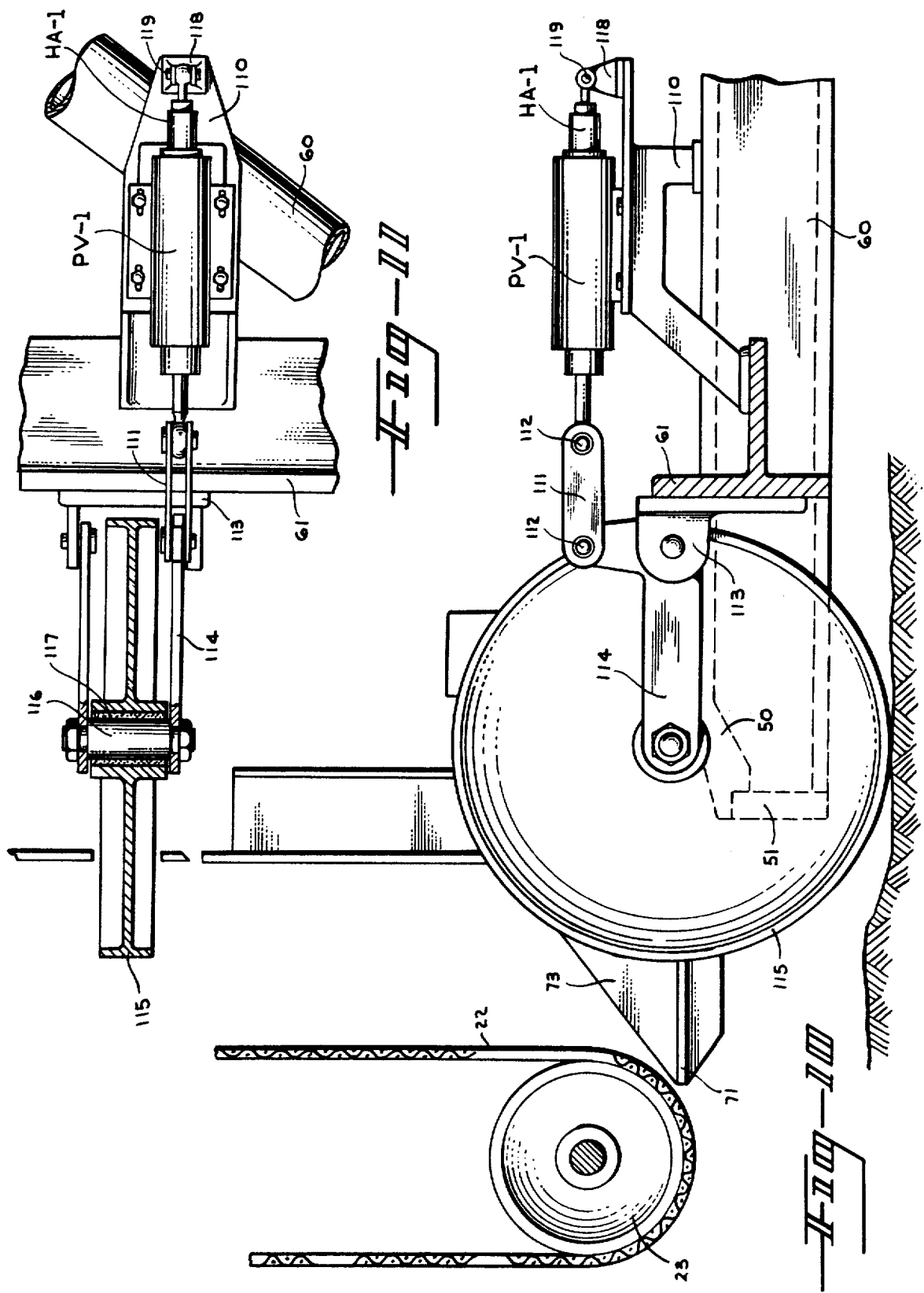

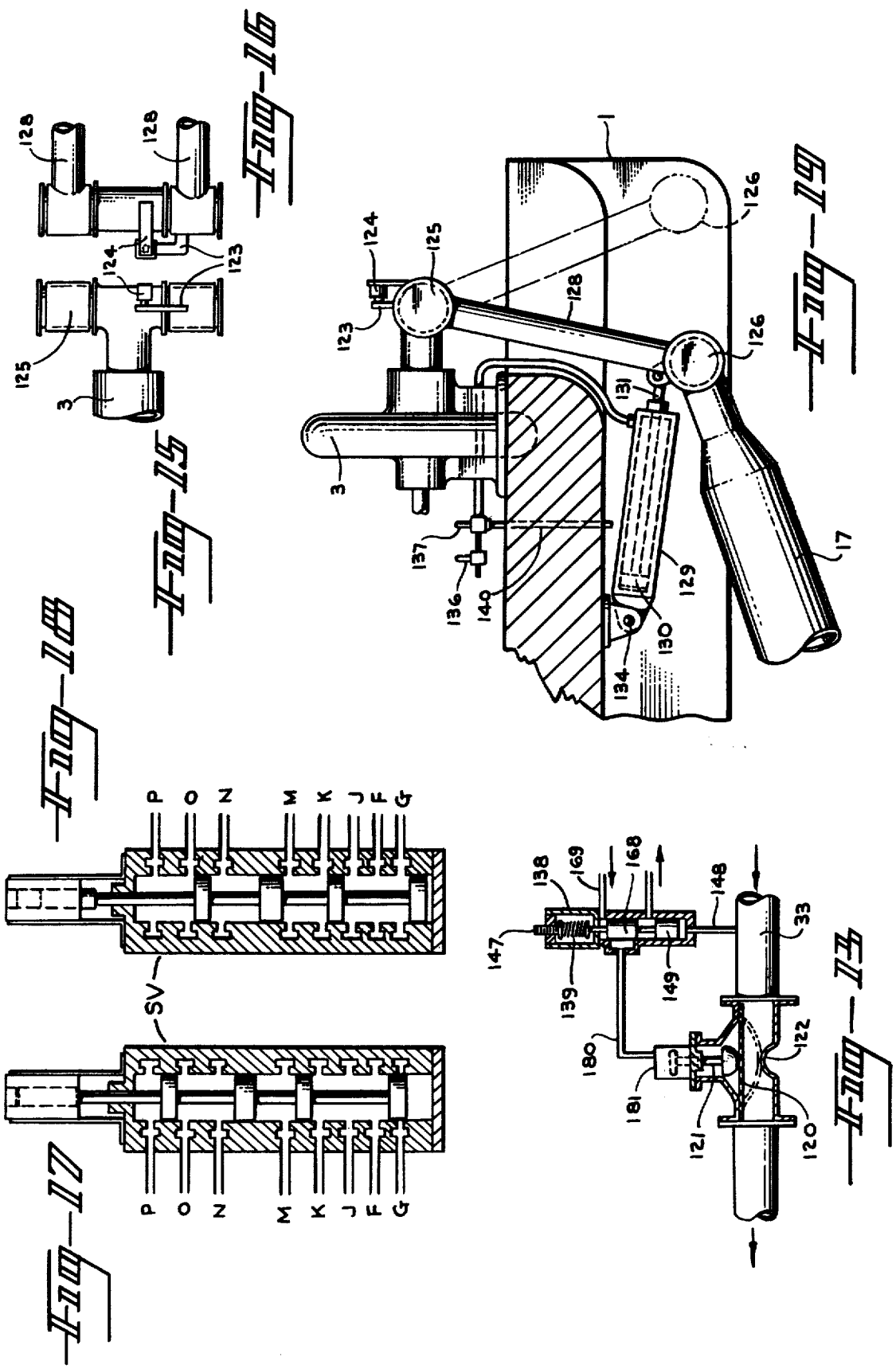

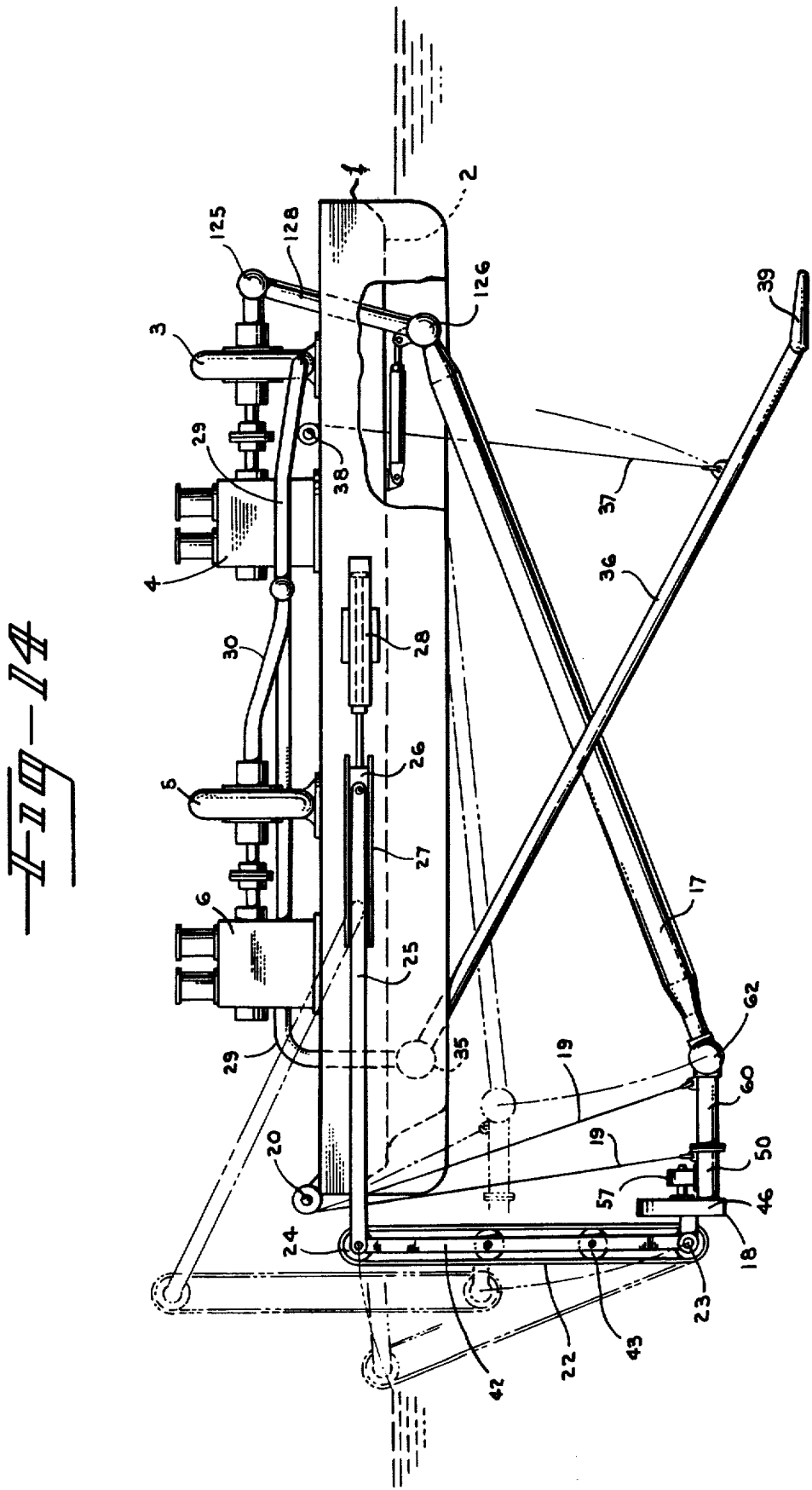

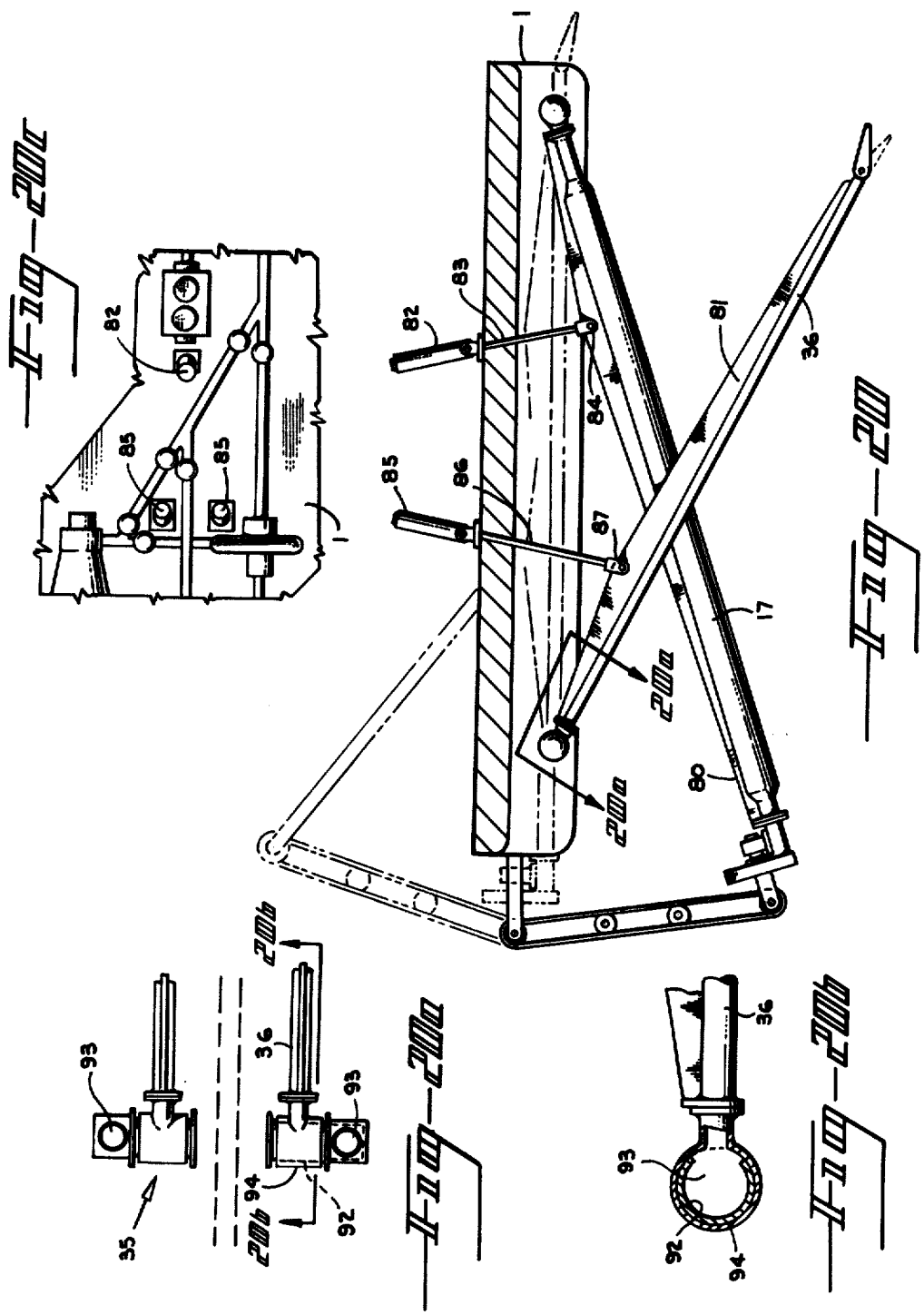

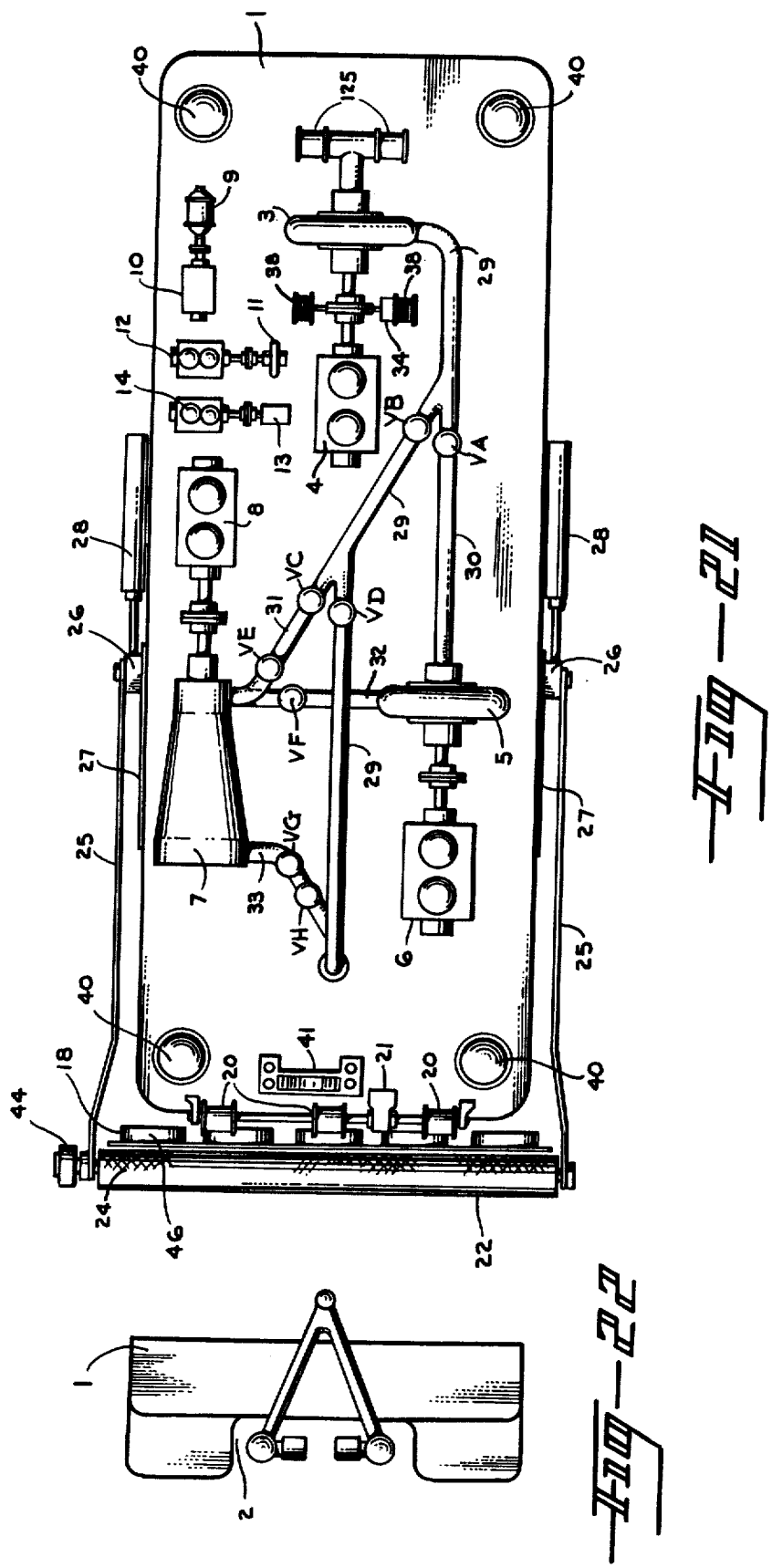

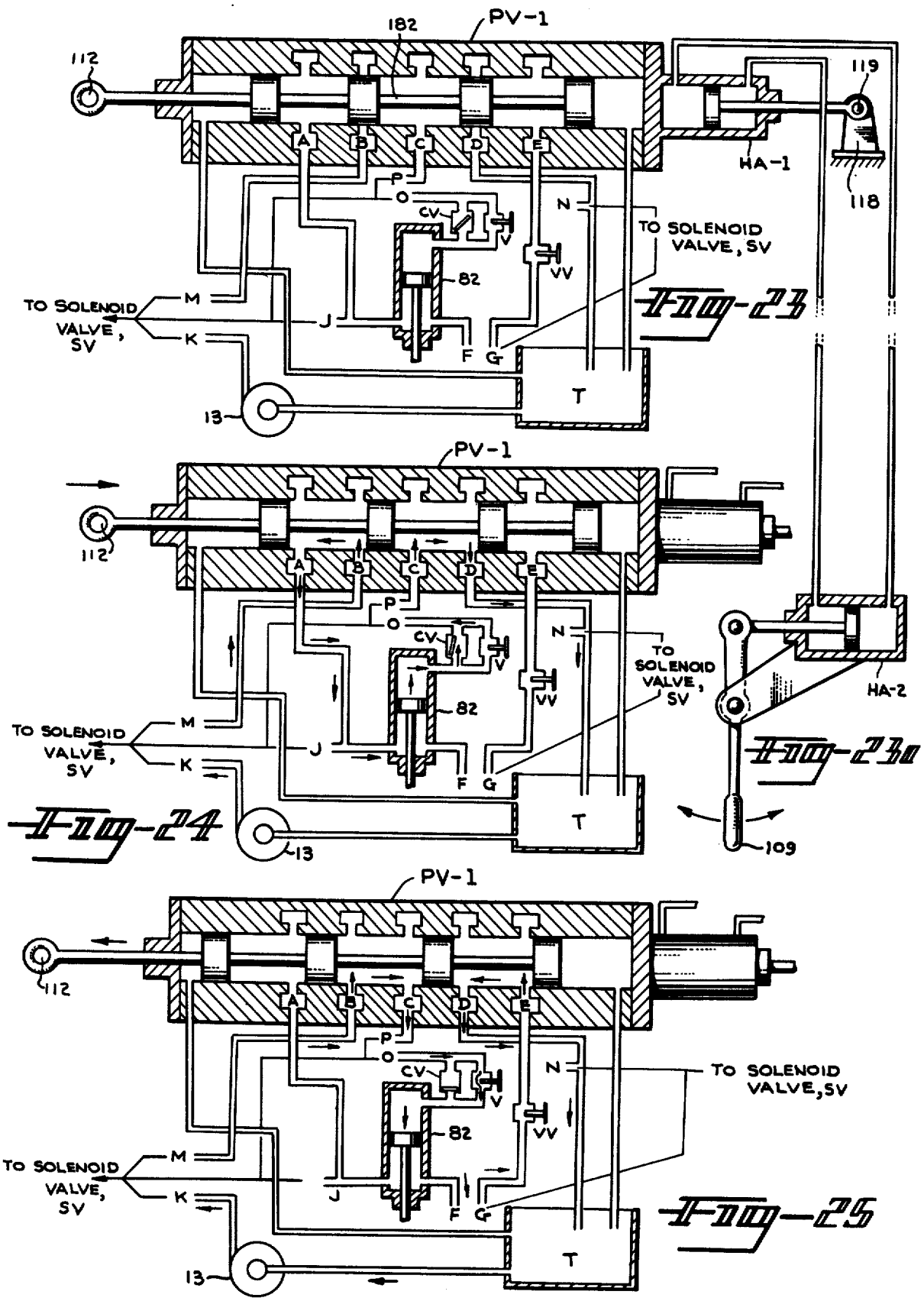

PILOT VALVE UP

EMERGENCY UP

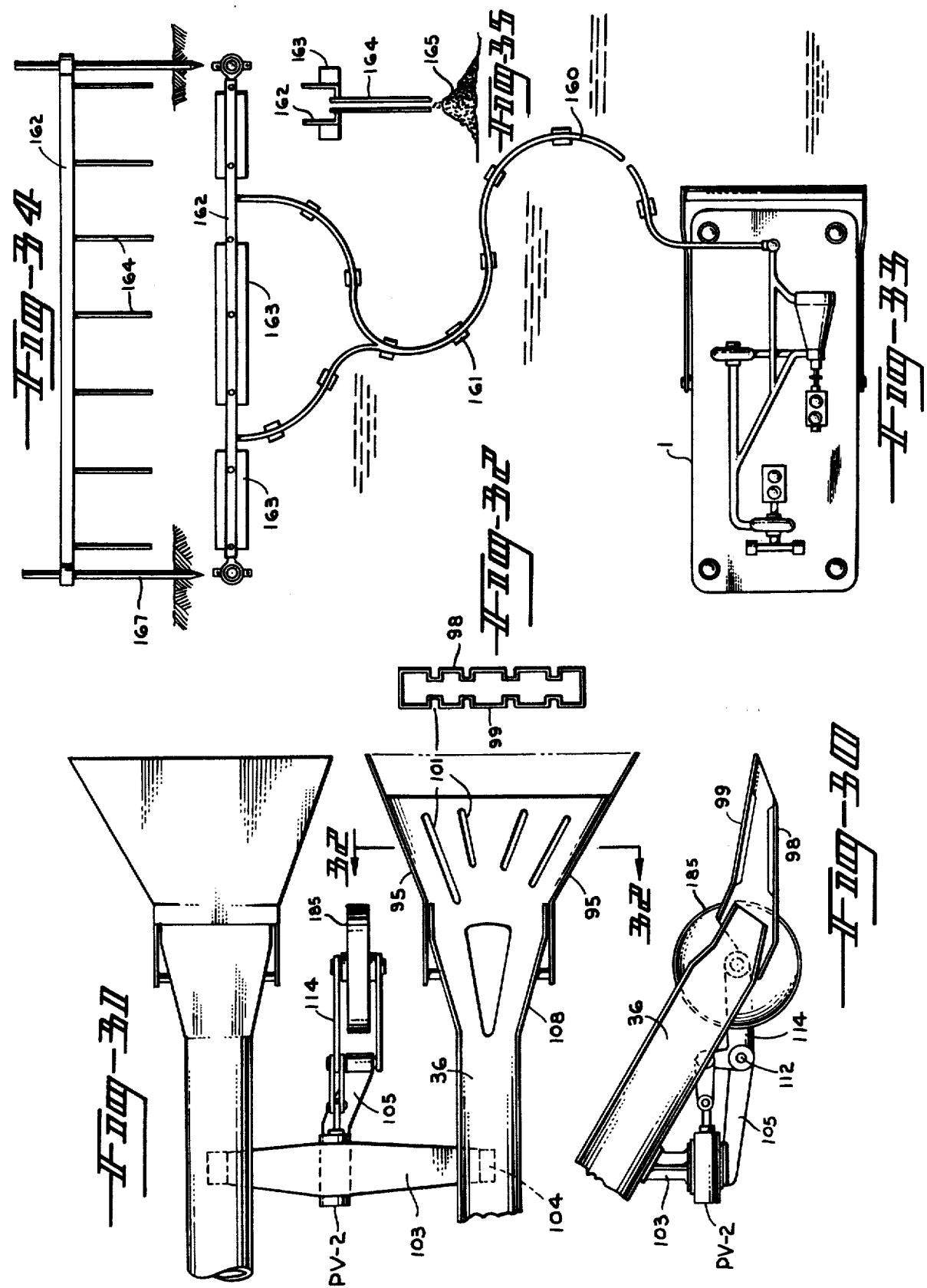

MECHANICAL ELIMINATION OF AQUATIC GROWTHS

This a division, of application Ser. No. 364,283, filed May 29, 1973.

RELATED INVENTIONS

In my U.S. Pat. No. 3,546,858, there is disclosed, an apparatus for removing whole growths from a body of water, after which they are shredded and normally packaged in the form of blocks or briquettes. Where they are not suitable for use in any of the forms here disclosed, the shredded growths may be returned to the body of water from which they were removed.

In my U.S. Pat. No. 3,540,194, there is disclosed, an apparatus for removing marine growths and their roots from a water bottom by first loosening their root structure by pressure water, in a step-by-step process, then exploding the growths and roots upward by compressed air, the material is then removed by a chain conveyor, shredded, compressed into blocks, or pumped to a shore area.

In my patent application Ser. No. 249,371, there is disclosed, a continuous method for not only removing marine growths and their roots from a water bottom, but also for removing the nutriments and silt in which they were growing. This is accomplished by continuously moving a relatively horizontal tube or pipe through and below the growths while continuously ejecting pressure water to loosen the root structure, and periodically ejecting pressure air to separate the root structure from the water bottom, the material is then cut and removed by suction. A return pass of the apparatus rewashes the water bottom to remove any nutriments, silt or dirt not removed by the first operation. All material so removed is used to form a deep water reef or barrier to limit inflow of dirt and nutriments from adjacent storm or other sewers.

OTHER PATENTS OF INTEREST

The problem of aquatic growths is not new. In fact, it has been recognized for over one hundred years, and many attempts have been made to solve this problem.

The Piper U.S. Pat. No. 154,900 of 1874, provided equipment for cutting a swath through water plants to free the water for ice-making purposes.

The Christen U.S. Pat. No. 669,820 of 1901 has a large revolving knife assembly which cuts the growths as it is moved into the growth area. It is difficult to see how they can be cut into small pieces, as few, if any, are cut at the shear plate.

The King U.S. Pat. No. 727,807 of 1903, consists of a scow having a wide front recess which, on its forward movement, gathers the growths to an elevator and from there they are subjected to squeezing, drying and burning equipment, where they are ultimately consumed.

The Austin U.S. Pat. No. 733,360 of 1903, provides a belt member which picks up the growths from the water and delivers them to crushing rolls, and thereafter the crushed material is returned to the water.

The McDermott U.S. Pat. No. 2,322,865 of 1943, discloses an apparatus for repeatedly severing tule stalks during the growing season some distance below the water level, thereby to cut off air admission to the roots.

The Grinwald U.S. Pat. No. 2,486,275 of 1949, discloses an apparatus in the form of a scoop which strips growths from the bottom, or gathers floating growths from the surface, and delivers them to the deck of a barge.

The Smith U.S. Pat. No. 2,629,218 of 1953, discloses a shearing device for gathering Irish moss by cutting it off above the roots, and then lifting it by a suction device to a basket on a boat or barge.

The Grinwald U.S. Pat. No. 3,286,447 of 1966, discloses an apparatus for stripping weeds from the bottom of a lake, then gathering them, subjecting them to a compressing operation and thereafter unloading them either to the shore of a lake, or to a barge. The weeds are cut by a chain blade cutting device and removed from the lake by a conveyor.

The Grinwald U.S. Pat. No. 3,347,029 of 1967, discloses improvements over his earilier U.S. Pat. No. 3,286,447, namely, the provision of improved means for operating the cutters, and improved means for handling the material.

BACKGROUND INFORMATION

Notwithstanding the above and many other developments designed to eliminate aquatic growths, little use has been made of them, due to their small capacity, cost of operation, and general inefficiency, due, largely, to the attempts to remove whole growths in a tangled, bulky mass, and almost no attempt to remove any part of their root structure to inhibit future growth.

A few years ago, as the aquatic growths problem became more serious, the use of various chemicals was undertaken. All of these are in some form of poison, and, while affording some temporary relief, as far as aquatic growths were concerned, their use frequently resulted in massive fish kills, use of lake water for irrigation killed lawns and gardens, and all water activities and use of lakes so treated were forbidden for an indefinite period of time.

In January of 1972, the Florida Department of Natural Resources located at Tallahassee, Florida, acting under the Florida Aquatic Weed Conrol Act of 1970, issued a directive under the title "Guidelines for Aquatic Weed Control." Admittedly the use of chemicals is a stop-gap measure. And this directive goes on to state "The short term goal of the Bureau of Aquatic Weed Control and Research is to control and reduce the spread and problem of noxious aquatic plants. The long-term goal is to strive through research to discover more effective and efficient means." It is also stated in the directive that "It is intended that wherever mechanical means are feasible and desirable, they should be employed in preference to chemicals."

It is to this long-term objective, as outlined above, that this invention is primarily directed. To attain this long-term primary objective, a number of secondary objectives are essential:

Moving all upstanding and floating aquatic growths generally downward from the surface of the water in which they are growing, to a suction zone near or close to their root structure.

Drawing the growths by suction, and much of their roots through a cutting zone where they are severed into short lengths.

Moving the cut growths through a vacuum chamber to remove entrained air and growth juices from their stems and leaves, whereby the growth structure is collapsed.

Subjecting the cut and collapsed growths to additional cutting to further reduce their growth identity and particle size.

Applying pressure during the secondary cutting operation to force out any remaining air or growths juices, and render the material so treated, completely inert.

Returning the growths so processed to the water bottom from which they were originally removed, in the form of a blanket layer to discourage further growths development, or to deliver the inert mass to a remote location.

Automatically maintaining an optimum position of the suction and primary cutting mechanism relative to the growth root structure and water bottom.

Automatically lifting the primary cutting mechanism to clear an obstruction.

Automatically maintaining an optimum position for the discharge mechanism relative to the water bottom to form a blanket of the processed inert material.

The invention will be better understood as well as further objects and advantages become more apparent from the ensuing detailed specification of the exemplary embodiments taken in conjunction with the drawing.

BRIEF DESCRIPTION OF THE DRAWING

FIG. 1 is an enlarged view of the conveyor feeding upstanding growths and their roots to a cutter;

FIG. 2 is a schematic view of the primary and secondary cutters, vacuum chamber and delivery pipe;

FIG. 2a is a typical view showing the general appearance of aquatic growths after primary cutting;

FIG. 2b is a typical view showing the general appearance of a cut aquatic growth after being exposed to vacuum;

FIG. 2c is a typical view showing the general appearance of aquatic growths after secondary cutting;

FIG. 3 shows the general appearance of an upstanding aquatic growth prior to capture by the conveying and cutting mechanism;

FIG. 4 discloses the functional arrangement of the system;

FIG. 5 is a cross-sectional view on line 12—12 of FIG. 11;

FIG. 6 is a sectional view of a single primary cutter assembly;

FIG. 6a is a partial sectional view of the pressure water jet assembly;

FIG. 7 is a front elevational view of a single primary cutter assembly with a portion of the housing cut away;

FIG. 8 is a top plan view of the primary cutting and collecting assembly;

FIG. 9 is a front elevational view of the primary cutters;

FIG. 10 is a detailed side elevational view of the depth control device;

FIG. 11 is a top plan view of the depth control device with the contact drum shown in section;

FIG. 13 shows the diaphragm valve for controlling the back pressure for the secondary cutter in cross section;

FIG. 14 is a side elevational view of the barge with its equipment and with the cooperating conveying and cutting mechanism shown in full line lowered position and also in a dotted line raised position;

FIG. 15 is a top plan view of the upper swinging pipe joints;

FIG. 16 is a rear elevational view of the upper swinging pipe joints;

FIG. 17 is a sectional view through the solenoid valve in position to automatically lift the primary cutter assemblies clear of an obstruction;

FIG. 18 is a sectional view through the solenoid valve in neutral position;

FIG. 19 shows the safety device for the primary cutter assembly in full line and dotted line position and arranged to permit the assembly to stop its forward movement on encountering an obstruction;

FIG. 20 shows an alternative arrangement for lifting the suction and discharge pipes by hydraulic cylinders rather than by cables as shown in FIG. 19;

FIG. 20a shows a detailed view of the swinging pipe joint on lines 14A — 14A of FIG. 14;

FIG. 20b is a sectional view through the swinging pipe joint;

FIG. 20c is a partial plan view of the deck showing the position of the lift cylinders;

FIG. 21 is a top plan view of the pumping and auxiliary cutting equipment located on the deck of a floatable structure;

FIG. 22 is an end view of the discharge pipe;

FIG. 23 is a sectional view of the pilot valve in neutral position;

FIg. 23a is a sectional view through the hydraulic actuators for moving the pilot valves to control the position of the primary cutters;

FIG. 24 is a sectional view through the pilot valve in position to lift the primary cutter assembly;

FIG. 25 is a sectional view through the pilot valve in position to move the primary cutter assembly down;

FIG. 30 is a side elevational view, partly in section, of the distributing device with depth control for spreading the processed aquatic growths in the form of a blanket on the water bottom;

FIG. 31 is a partial plan and sectional view of the dual spreaders with the depth control located in the center between the spreaders;

FIG. 32 is a sectional view through one of the spreaders;

FIG. 33 is a view illustrating how the processed aquatic growths may be deposited at a location remote from that from which they were removed;

FIG. 34 is a side elevational view of the depositing device of FIG. 33; and

FIG. 35 is an end view, partly in section, of the depositing device of FIG. 33.

Figure 12:
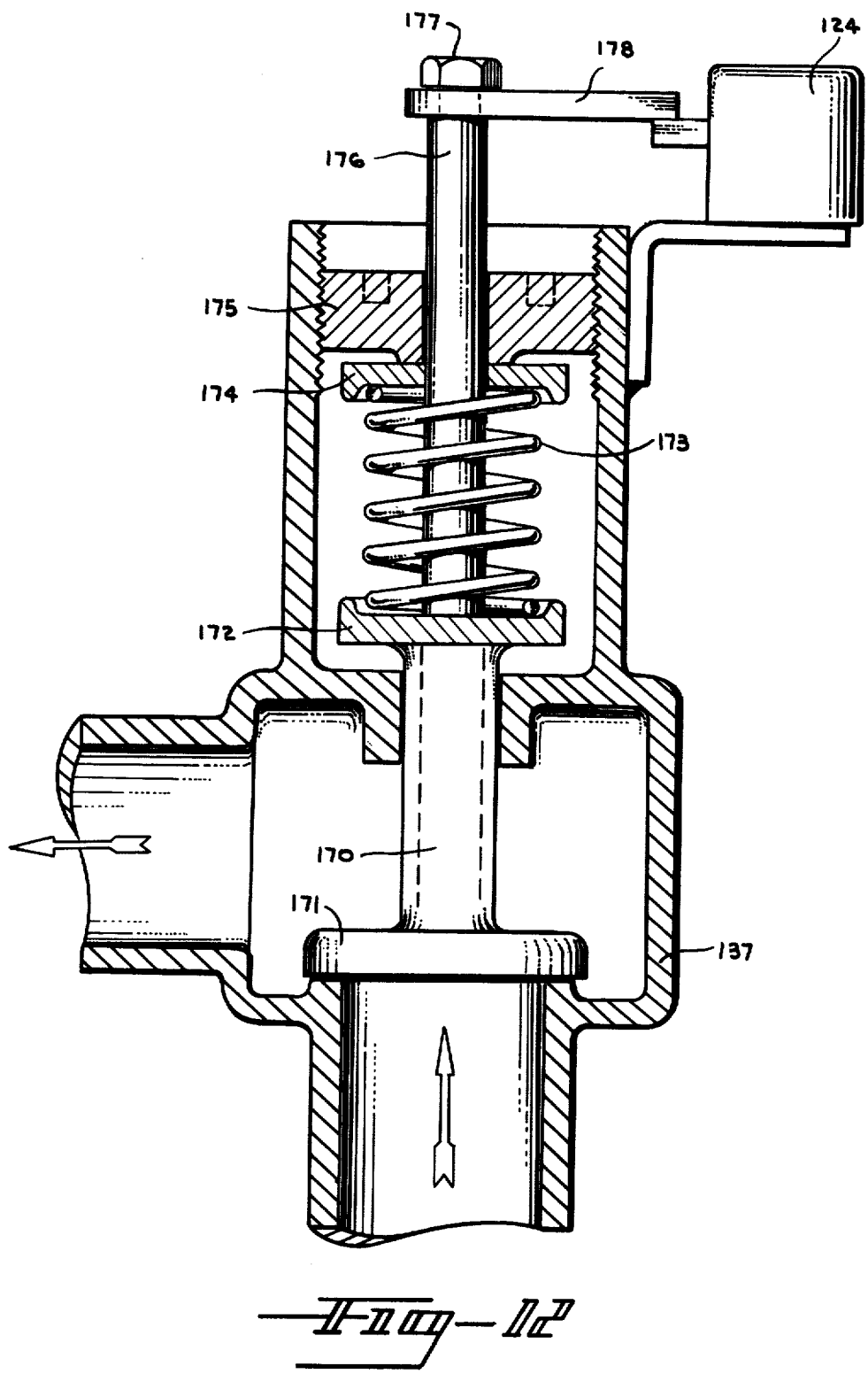
FIG. 12 is a sectional view of an alternative method of operating the solenoid valve from that shown in FIGS. 15 and 16.

The substance of this invention can be best understood by first referring to FIGS. 1, 2 and 4, in this order.

Referring particularly to FIG. 1, the primary cutter assembly in moving to the left, which brings the upstanding aquatic growths 150 in contact with the downwardly moving open mesh belt 22, the water in which the aquatics are growing passing through the open mesh, bringing the growths in contact therewith, resulting in their being moved down and underneath the bottom roll 23 where they are caught by the suction through pipe 49.

This suction draws the growths and much of their roots through a cutting zone defined by the stationary blade 51 and the moving blade 52, and they are cut into short pieces as indicated in FIG. 2 and 2a. The suction zone is defined between the water bottom and a horizontal member 71, and the bottom roll 23. The depth of this suction zone, or the distance between the water bottom and the member 71 is adjustable and controlled automatically, as will be explained later.

Referring to FIGS. 6 and 7, the primary cutter assembly consists of a suction pipe 49, and on its top wall 50 is mounted a fluid motor 57, driving a rotary cutter 52 mounted on the flange 53 of the fluid motor shaft. The rotary cutter operates in an enclosure defined by the rear wall 54, the front wall 56, and the spacer 55. An opening 59 is provided in the front wall 56 through which the aquatic growths and their roots are drawn by suction, and, in passing through this opening, they are cut into short pieces by the interaction of the stationary blades 51 and the moving blades 52.

To aid in directing the growths through the suction opening 59, pressure water jets 75, from manifolds 74, urge the growths and their roots toward the opening 59. Pressure water for these jets is supplied through pipe 58.

Referring more particularly to FIGS. 2 and 3, the general character of the upstanding aquatic growth is best shown in these views. Air retained in the stems and leaves, holds it in a generally vertical position. Shown at a reduced scale in FIG. 2, the upstanding and sometimes floating growths 150 are drawn downwardly by contact with the open mesh belt 22, and through the cutting zone as previously described where they are cut into short pieces, the general character of which is indicated by FIG. 2a.

These cut growths then pass into a vacuum chamber 17, where the entrained air and much of their growth juices are removed, and the general character of the cut and collapsed growth is indicated by FIG. 2b. From the vacuum chamber 17, the growths pass through the main suction pump 3 and may be delivered to a pressure pump 5, for further cutting and processing by the secondary cutter 7, from which they pass down through pipe 36 to be spread as a blanket on the water bottom from which they were removed. The general character of the growths at this point is indicated in FIG. 2c, and their growth identity is completely destroyed.

Crushing or shredding whole length aquatic growths is a most ineffective method of destroying their growth identity. The growth juices are left intact, and any shredding or crushing operation frequently increases their ability to repropagate.

Referring to FIGS. 4 and 5, there are indicated the various kinds of processing treatments to which the growths may be subjected, depending on the initial character of the growths, and the desired final product. For instance, the cut and collapsed growths may be returned directly to the water bottom as indicated by the single arrows. In this case, valve VD is open and valves VA, VB, VG and VH are closed. If it is desired to recut the growths without pressure, the growths follow the double arrows with valves VB and VG open, and valves VD, VA, VF and VH closed.

The secondary cutting mechanism here shown, is known as a jordan, and is widely used in the pulp and paper industry in the preparation of paper making materials. It generally consists of a conical outer housing 145 having internally projecting cutter blades 144, and an inner conical member having outwardly projecting blades 142. The inner member is adjustable endwise, to bring the stationary and rotating blades into the desired contact or relationship.

Pulp and paper materials are frequently treated under pressure, which tends to increase their density and reduces the particle size. This can here be utilized by opening valves VA, VF and VH, and closing valves VD, VB and VG.

The preferred type of valve is a commercial diaphragm valve, the general structure of which is shown by FIG. 13. The flexible diaphragm 120 is forced down by plunger 121 and the piston in cylinder 181 to the position indicated by the dotted line. When open, this type of valve has nothing to obstruct the flow of material. In the case of valve VH, used to control back pressure on the secondary cutter, a commercial pressure control valve may be used, the valve member 168 being moved by piston 149, from pressure on the secondary cutter discharge pipe 33, which increases or decreases the pressure in cylinder 181, in a manner well known in the art.

Any reasonable number of primary cutter assemblies shown in FIGS. 6 and 7 can be assembled as shown in FIGS. 8 and 9, five being shown in this particular case. Each cutter assembly is bolted to a suction manifold 60, which is connected by a rotary joint 62, to vacuum chamber 17. Each primary cutter assembly can be readily removed for repair or replacement. A bracket extension 66, from the suction manifold 60, provides bearings 18 for supporting the lower roll 23.

The distance or space between the lower roll 23, the horizontal plate 71, and the growths root structure (FIG. 1) is automatically regulated by a depth control device shown in detail by FIGS. 10 and 11, and in assembly by FIGS. 8 and 9. It comprises a roll or drum 115, traveling over the water bottom after the growths and their roots have been removed. This roll or drum is mounted on a lever 114, pivoted in bracket 113, secured to the tie member 61 of suction manifold 60. A right angle extension of the lever 114 connects through links 111 and pins 112 to the valve stem of pilot valve PV-1. It will thus be seen that any movement of the drum 115 up or down, will be transmitted to the pilot valve PV-1 which will cause the entire primary cutter assembly to be moved up or down as will be explained later.

Referring now to FIGS. 21 and 14, the primary cutter assembly is supported by three cables 19, secured at the lower ends to lugs 65 on the suction manifold 60 and tie bar 61 (FIG. 9). At the upper end, the cables 19 are secured to cable drums 20, actuated by a fluid motor 21. This fluid motor 21 is actuated by pressure fluid under control of pilot valve PV-1 and solenoid valve SV, as will be described later.

In FIG. 21, there is shown on the deck of the floating structure 1, the various equipment discussed in detail in connection with FIG. 4 comprising generally the main suction pump 3 and its driving engine 4, as well as the pressure pump 5 and its driving engine 6. The secondary cutter 7 and its driving engine 8 are also shown in this view as well as the pressure oil pump 13, its driving engine 14, the pressure water pump 11 and its driving engine 12, the electric generator 9 and its driving engine 10. Cable drums 38 driven by fluid motor 34 are used to move the discharge pipes 36 up and down. A master control station is shown at 41.

For moving the floating structure 1 and the equipment associated therewith from place to place, and to move it forward in operation, four electric propulsion units 40 are used, each capable of being rotated a full 360° so that their propulsive effort can be utilized to direct the movement of the floating structure and its equipment in any direction and speed. This method of propulsion is particularly useful in holding the equipment on course during side winds.

Referring to FIG. 14, the primary cutter assembly is shown suspended from the floating structure 1 by cables 19, as has already been described, a swinging pipe joint 62 between the primary cutter assembly and the vacuum chamber 17 permits the assembly to be retained in a horizontal position while being moved up and down. Swinging pipe joint 126 at the upper end, permits the entire assembly of the primary cutters and the vacuum chamber 17 to be moved up and down.

It will be noted in FIG. 22, that there is a longitudinal recess on the underside of the floating structure 1, extending its entire length. This permits the single suction pipe and vacuum chamber 17 and the dual discharge pipes 36 to be lifted up into this recess, permitting the equipment to operate in or to be moved in shallow water.

The open mesh belt 22 shown at the left in FIG. 14 is supported at the lower end by roll 23, turning in bearings 18 (FIG. 8), carried by bracket 66 from the suction manifold of the primary cutter assembly. At the top end, the open mesh conveyor is supported and driven by roll 24 which is operated by fluid motor 44. Spacing member 42 holds the rolls 23 and 24 in proper position relative to each other. One or more intermediate rolls 43, hold the moving open mesh belt 22 in position against the pressure of the water and growths, as the equipment is moved to the left.

The upper roll 24 is supported in bearings in the ends of two links 25. The opposite ends of links 25 are pivoted to sliding blocks 26, capable of being moved back and forth in guides 27 by cylinders 28. The object of this arrangement is, first, to provide a bearing support for the top roll 24, and, second, to provide for positioning the top roll 24 at the will of the operator in the various positions indicated by the dotted lines.

The two discharge pipes 36 are supported by cables 37, and cable drums 38 driven by a fluid motor 34. The obvious reason for having two discharge pipes 36 is to avoid interference with the single suction pipe and vacuum chamber 17, and also to provide for a wider spread of the processed growths on the water bottom. The two discharge pipes 36 may also be drawn up into the central recess 2, on the underside of the floating structure.

It will be noted, that of necessity, the depth control device of FIG. 10 must be mounted back of the foremost part of the primary cutter mechanism, and the drum 115 contacts the water bottom after the growths and roots have been removed. Also, that only one of these devices can be used, and is located near the center of the primary cutter assembly as shown in FIGS. 8 and 9. This means that some unevenness of the water bottom or some obstruction may be encountered by some part of the primary cutter assembly, usually, the curved section at the bottom of the front cover 56, FIG. 6. This may result in some injury to the primary cutter assembly, or dirt and other foreign material being drawn into the suction openings 59.

To guard against this, a safety device, shown in FIG. 14 and also in FIG. 19 is utilized. Instead of the upper end of the suction pipe and vacuum chamber 17 being rigidly attached to the floating structure 1, it is attached by an articulated or swinging pipe joint 126 to pipe 128 which is, in turn, connected at its upper end to the main suction pipe by swinging joint 125. The pipe 128 and the primary cutter assembly is held in its normal forward operating position by piston rod 131, and piston 130 operating in cylinder 129. The presssure on cylinder 129 is regulated by a pressure reducing valve 136 set just high enough to hold the primary cutter assembly in forward position for normal operation. A pressure relief valve 137 is set at a slightly higher pressure.

Should the primary cutter assembly encounter an obstruction, its forward movement can then stop, and the increased pressure on the cylinder will be relieved through the relief valve 137, and the pipe 128 will move to the right. At the start of such movement, switch 124 will be actuated, which will actuate the solenoid valve SV to the position shown in FIG. 23, which will start lifting the primary cutter assembly clear of the obstruction as will be described in detail later.

As soon as the primary cutter assembly has cleared the obstruction, the increased pressure on cylinder 129 will cease, and the pressure from control valve 136 will return the primary cutter assembly to normal position. Referring to FIGS. 15 and 16, a tee-shaped pipe section is secured to the main suction pump 3, and on the ends of the tee section, are mounted swinging pipe joints 125 of conventional design, well known in the art. Secured to the central section is a bracket carrying a switch 124. Secured to one of the movable swinging joints is a bracket 123 which actuates the switch 124 the instant that the pipes 128 start their movement to the right.

The operation of the depth control device, FIG. 10, the pilot valve, FIGS. 23, 24 and 25, and the solenoid valve, FIGS. 17 and 18, will now be explained. This operation can be best understood by referring to FIGS. 26, 27, 28 and 29.

Figure 26:
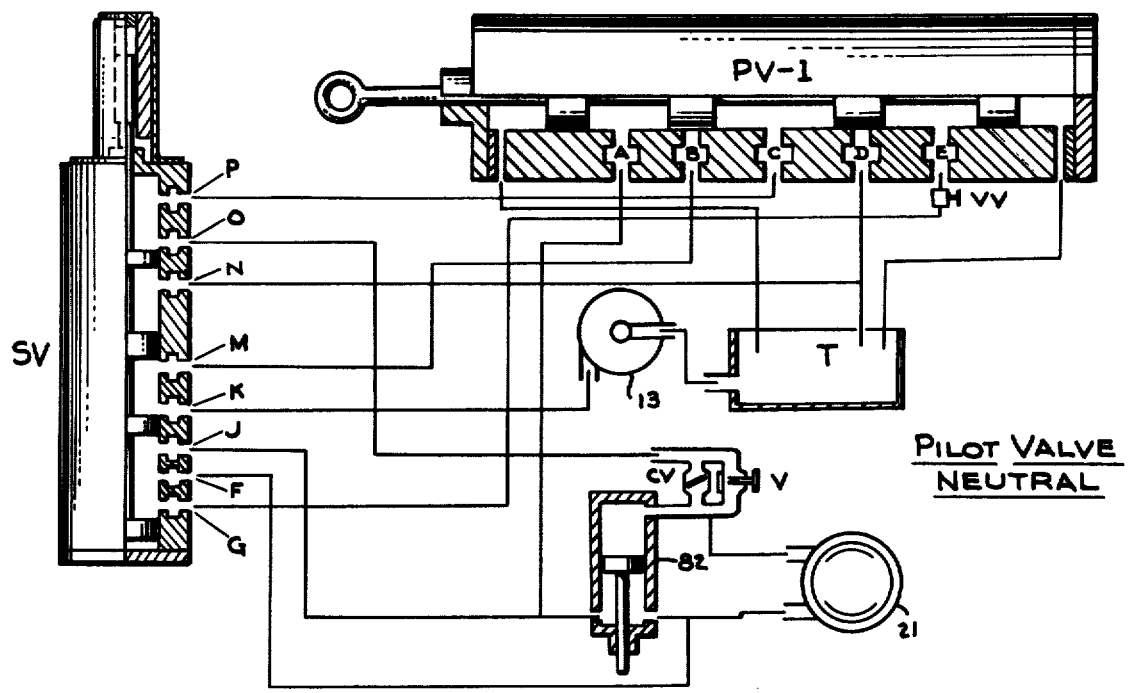
FIG. 26 is a schematic view of the pilot and solenoid valves in neutral position.

In FIG. 26, the pilot valve PV-1 is shown in neutral position, the solenoid valve SV in non-operative position, the pressure pump is shown at 13, the oil supply tank at T, and the lifting means for the primary cutter assembly either in the cylinder 82 (to be explained later), or the fluid motor 21. Pressure from pump P through SV ports K and M is blocked by the position of the pilot valve at port B.

Figure 27:
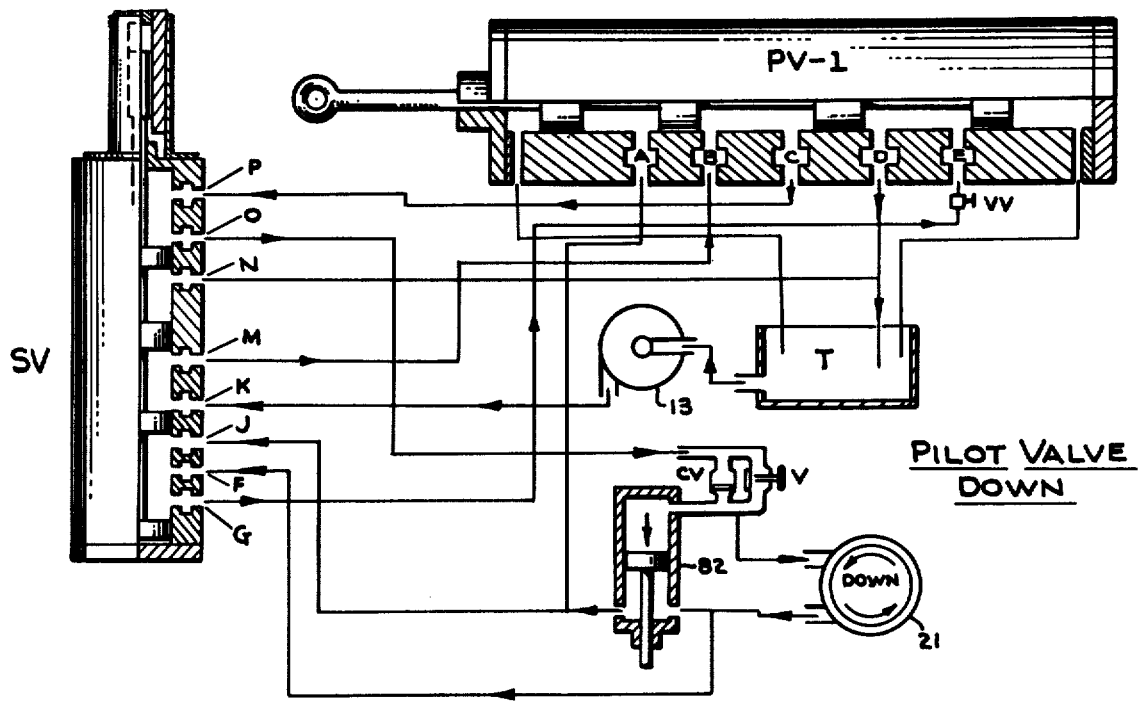
FIG. 27 is a schematic view showing the solenoid valve in neutral position, and the pilot valve in position to move the primary cutter assembly down.

In FIG. 27, the depth control device has moved the pilot valve to the left, thus requiring that the primary cutting assembly be moved down. The pressure oil flow from pump 13 follows the arrows through SV ports K and M, through PV ports B and C, through SV ports P and O, through the flow control valve V to the down side of cylinder 82 or fluid motor 21. The check valve CV is closed and the valve V is adjusted by the operator for the desired speed of down movement. The flow from the opposite end of cylinder 82 or fluid motor 21 is through SV ports J, F and G, a second speed control valve VV, PV ports E and D to the tank T. It will thus be seen that the operator has two speed control valves, valve V in the pressure side, and valve VV in the discharge side. The downward movement of the primary cutter assembly will continue until the depth control device returns the pilot valve to neutral position.

Figure 28:
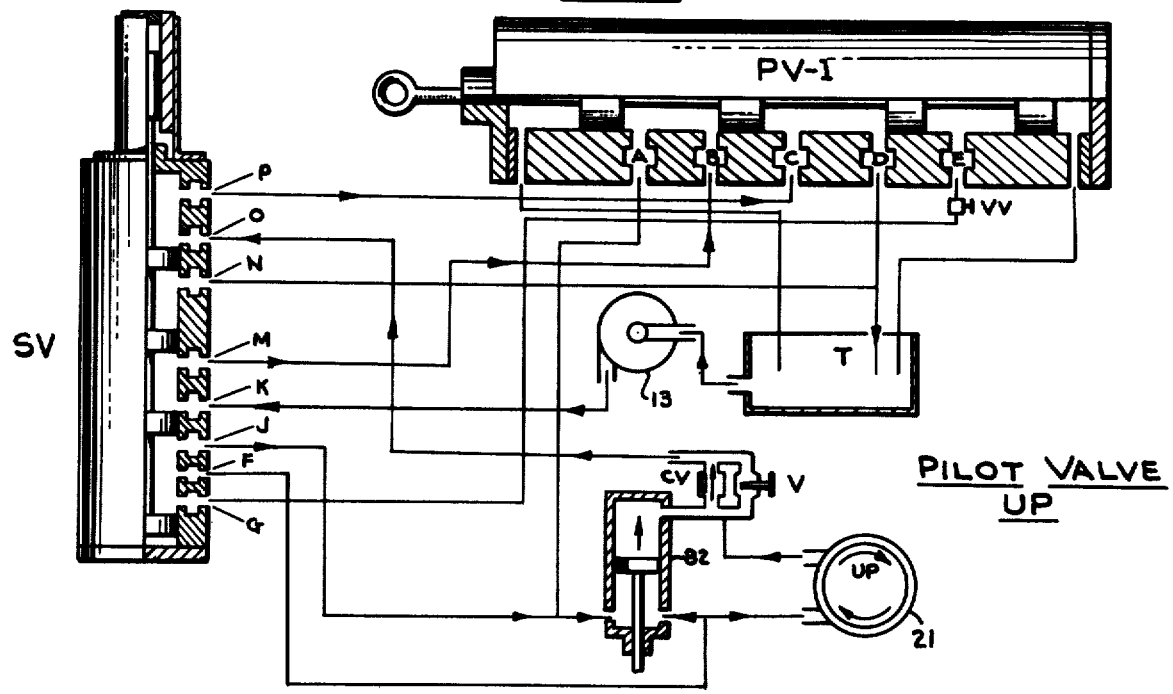
FIG. 28 is a schematic view showing the pilot and solenoid valves with the solenoid valve in neutral position, and the pilot valve in position to move the primary cutter assembly up.

In FIG. 28, the depth control device has moved the pilot valve to the right, thus requiring that the primary cutting assembly be moved up. The pressure oil from pump 13 follows the arrows through SV ports K and M, through PV ports A and B, and to the upside of cylinder 82 or fluid motor 21. From the opposite side of cylinder 82 or fluid motor 21, the flow is through check valve CV, SV and O and P, PV ports C and D to tank T. It will thus be seen that the upflow is unrestricted, and that the primary cutter assembly is moved up quickly at the request of the depth control device.

Figure 29:
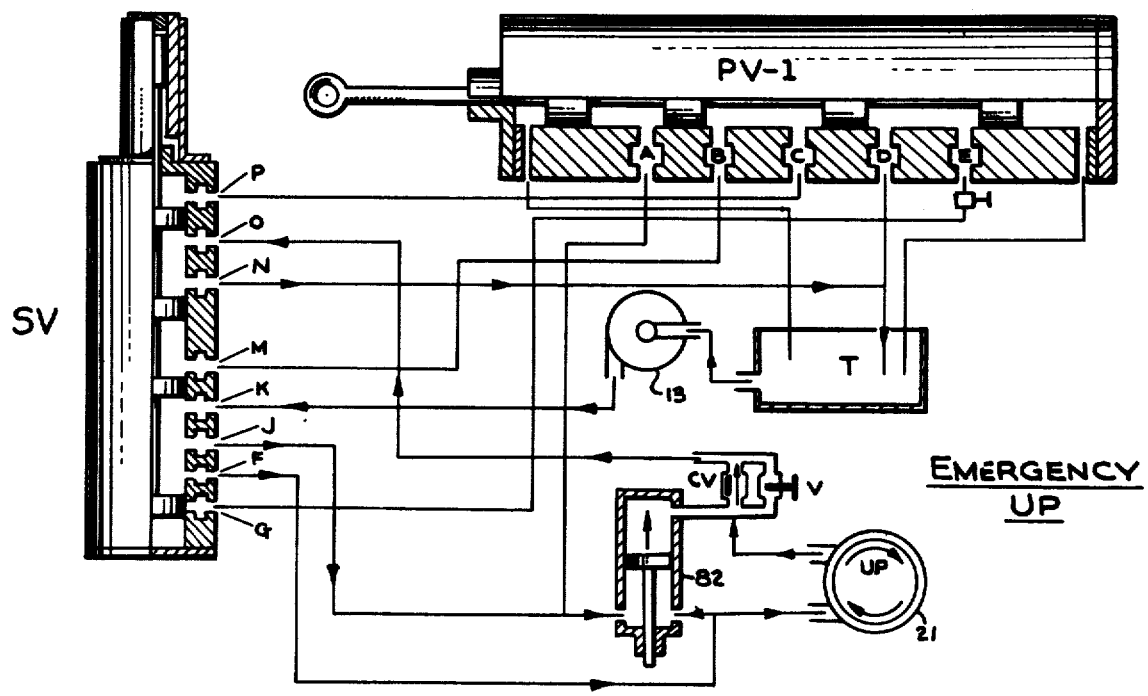
FIG. 29 is a schematic view showing the pilot and solenoid valves with the pilot valve in neutral position and with the solenoid valve operated to move the primary assembly up.

In FIG. 29, the switch 124 has activated the solenoid valve SV for an emergency up movement of the primary cutter assembly. The pressure oil flow from pump 13 is through SV ports K, J and F, directly to the upside of cylinder 82 or fluid motor 21. From the other side of cylinder 82 or fluid motor 21, the flow is through check valve CV, SV ports O and N to the tank T. Possible flow from PV ports D and E is blocked by SV port G.

It will thus be seen that the operation of the solenoid valve SV effectively short-circuits the pilot valve control for the time being.

By referring now to FIG. 12, one will observe that there is shown an alternate method for activating the switch 124 and solenoid valve SV for emergency up movement of the primary cutter assembly to clear an obstruction. This figure shows a typical cross section of a standard-type relief valve with the valve seat at 171, the main valve stem at 170, spring 172, and adjusting nut 175. The valve stem has an extension 176, and secured to this stem by nut 177 is a switch actuating arm 178, which, in the position shown, holds the switch contacts open. Should the primary cutter assembly encounter an obstruction, and the piston 130 in cylinder 129 start moving to the right, the relief valve will open, switch 124 will be closed, solenoid valve SV will be activated, and the primary cutter assembly will move up. This movement will continue until the obstruction has been cleared, at which time, the movement of the piston in cylinder 129 will stop, the relief valve will close, the solenoid valve SV will be de-activated, the upward movement of the primary cutter assembly will cease, and the up and down movement of the primary cutter assembly returned to the control of the pilot valve and the depth control device. The assembly will move down and at the same time, the pressure in the cylinder 129 will return the assembly to its normal forward position.

This embodiment of the invention has certain desirable features over that shown in FIG. 14 which will be recognized by those skilled in the art, for in this case, the upward movement of the primary cutter assembly will continue until the mechanism has completely returned to its normal forward position. With the use of the device of FIG. 12, as soon as the primary cutter assembly has cleared an obstruction, it can be placed under the control of the depth control device of FIG. 10, while the primary cutter assembly is being returned to its normal forward position.

For different kinds and types of aquatic growths, varying conditions of the root structure and the water bottom, it may be desirable to structure the space or distance between the water bottom and the bottom of roll 23 (FIG. 19) and the horizontal plate 71. This may be accomplished at the will of the operator by a commercial device known as a hydraulic actuator, shown in FIG. 23a, and also in FIGS. 10 and 11. This device comprises two cylinders having pistons therein and connected together by pipes and filled with a noncompressible fluid. One of these cylinders is located at the master control station and is operated by a lever. The other cylinder is a part of the pilot valve structucr pV-1, the piston rod of which is fastend to the plate on which the pilot valve PV-1 is slidably mounted. Movement of the lever and piston at the master control station will result in a corresponding movement at the pilot valve.

It will thus be seen that should the pilot valave PV-1 be moved to the right (FIG. 10), the drum 115 will be moved down, having the same effect as if the drum had encountered an obstruction, and the primary cutter assembly will be moved up. Moving the pilot valve to the right will have the opposite effect, and the primary cutter assembly will be moved down.

An alternate arrangement for moving the primary cutter assembly and the discharge pipe up and down, is shown in FIG. 20. In the case of the primary cutter assembly and the vacuum chamber 17, a hydraulic cylinder 82 is used, the piston rod 83 being connected at 84 to a reinforcing rib on the upper side of vacuum chamber 17. The swinging pipe joint between the vacuum chamber 17 and the primary cutter assembly is dispensed with, and the assembly is secured directly to the vacuum chamber 17. In the case of the two discharge pipes 36, two cylinders 85 are used, the piston rods 86 being secured at 87 to reinforcing ribs 81, located on the top of discharge pipes 36. The location of these cylinders, relative to other equipment, is shown in FIG. 20c. Conventional swinging-type pipe joints are used to secure the upper end of pipes 36 to the discharge pipe 29 through branch pipes 93. A member 94 encloses the internal discharge pipe 92, as shown in FIGS. 20a and 20b.

The lower terminal ends of discharge pipes 36 are provided with spreaders, as shown in FIGS. 30 and 31. The end of discharge pipe 36 is flattened and widened at 108, and discharges into a fan-shaped member 95. The top 99 of this member is somewhat longer than the bottom 98 so that the discharge is directed, generally, downward. Both 99 and 98 have diverging projections 101 on the inside, as shown in FIG. 16, which tend to spread the discharge horizontally to better form a blanket of the processed growths on the water bottom.

A depth control device similar to that already described and shown by FIGS. 10 and 11 is mounted in between the discharge pipes 36. Bracket 103 is mounted on the underside of discharge pipes 36, and to this bracket is secured the pilot valve PV-2. Secured to the underside of valve PV-2 is a bracket 105, on which the lever 114 is pivoted at 112, at the outer end of this lever 114 is the drum 185, which contacts the water bottom. It is unnecessary to equip this arrangement with a safety device as this is a trailing pipe and can ride up over any obstruction with the depth control drum missed.

The processed growths can be delivered to a location remote from that from which they were removed, as shown in FIG. 33. The processed growths are pumped through a hose or pipe 160, supported on the surface of the lake or other body of water by floats 161. These may deliver the material to a distributing device consisting of a trough 62 supported by floats 163 and having downwardly projecting pipes 164 which deposit the material in the form of a reef or barrier 165, to limit the inflow of deposits from nearby storm or other sewers. The troughs may be held in position by spuds 167 at each end, which facilitate moving the trough endwise to form a continuous reef.

Instead of forming a reef, the processed growths may be pumped to a deep part of the lake or other body of water, used to form an island, or spread over a land area.

This method of disposing of the processed aquatic growths and their roots is highly desirable, as substantial amounts of the nutriment materials in which the aquatics are growing are also removed, and without nutriments, aquatic growths cannot take root.

OPERATION

To place the apparatus for removing aquatic growths from a predetermined body of water into operation, the electric generator 9 is activated which permits the four propulsion units 40 to move the equipment to the location where it is desired to remove aquatic growths. The vacuum chamber 17 with the primary cutter assembly at the front end has been lifted up into the central recess in the bottom of the floating structure 1. The two discharge pipes 36 are likewise up in this recess. This configuration permits the equipment to be moved in shallow water, and also provides a more streamlined below-water structure than would be the case if the above-mentioned parts were not stored in the central recess.

The operataor at the master control station 41 has full control of the up and down movement of the primary cutter assembly, and the two discharge pipes 36. However, if he places the master control in full down position, the depth control device is activated so that when the proper down position is reached, the down movement will stop.

Upon reaching the area where it is desired to eliminate aquatic growths, the oil pressure pump 13, and the water pressure pump 11 are activated. The operator may then lower both the primary cutter assembly, and the discharge pipes 36 to approximately one-half way to the water bottom, and start the primary cutters operating. It is important that the primary cutters are started before the main suction pump 3 is activated, otherwise, the growths will become lodged between the stationary cutter blades, and the rotary blades may jam.

The operator should determine how the growths had best be processed, and adjust the various valves accordingly. If the growths are to be recut, the secondary cutter 7 should be activated. If they are to be recut under pressure, the pressure pump 5 must also be activated.

With the primary cutters operating, the main suction pump 3 is activated, and with the valves controlling the process properly set, the equipment may then be started, moving the apparatus carried by the floating structure 1 into the region of the upstanding and/or floating aquatic growths to be removed, and the primary cutter assembly is then lowered to its full down operating position. As soon as the equipment has moved forward its full length, the discharge pipes 36 can also be lowered to their operating position. The water jets 75 should also be activated, these to assist in directing the growths to the various suction openings in the primary cutters.

Vacuum and pressure gauges at the master control station indicate the operating condition at various locations in the hydraulic system, and enable the operator to utilize the equipment at or near its maximum capacity and efficiency, and at the same time, avoid overloading any part of the processing equipment. These gauges will also detect any malfunction which may occur, and enable the operator to take any necessary corrective action.

The operation of the apparatus for cutting aquatic growths into short pieces, as illustrated in FIG. 2, includes lowering the submersible housing 46 into position just above the bottom of a body of water having aquatic growths 150 extending upwardly therefrom, moving the floating structure 1 along the surface of the body of water so that the running open mesh belt 22 contacts the upwardly extending growths 150 and pulls them downwardly. The forward motion of floating structure 1 causes the aquatic growths 150 to pass beneath the plate 71, as shown at 152, and into an entry opening in the housing 46. Driven rotatable cutting members within the housing 46 cut the aquatic growths into small pieces 154. The small pieces 154 of aquatic growths are drawn through a discharge opening in the housing 46 in the vacuum chamber 17, which is placed under negative pressure by the main suction pump 3.

The pieces of aquatic growths may be delivered to the pressure pump 5 and thence to the secondary cutter 7 where they are further processed. The thus further processed pieces of aquatic growths are then passed through the pipes 36 and delivered as a blanket-like covering on the water bottom from which the growths were removed.

As best seen in FIGS. 14 and 20, the apparatus for removing upstanding and floating aquatic growths from a body of water includes a floating structure 1 which can be moved over the surface of the body of water while supporting the housing 46, which has the primary cutting members therein, and the vacuum chamber 17, which forms with the member 128 conveyor means for the removed and cut aquatic growths. The housing 46 and the vacuum chamber 17 can be moved upwardly and downwardly with respect to the surface of the body of water, in oscillatory fashion, as the structure 1 is moved along the surface. This affects the capture of aquatic growths of both the floating and upstanding type at various heights above the bottom of the body of water.

As shown in FIG. 10, the rotatable drum 115, which is mounted on the foremost part of the housing 46 (not shown in FIG. 10), housing the primary cutting members, contacts the bottom of the body of water as the floating structure 1 (FIG. 20) moves along its surface. The drum 115 thus senses the approach of obstacles and the unevenness of the water bottom. The drum 115 controls members which effect the raising of the structure suspended beneath the floating structure 1, the suspended structure including the open mesh belt 22, the roll 23, the housing 46, the vacuum chamber 17 and the pipes 36. The housing 46, vacuum chamber 17 and the pipes 36, which are best seen in FIG. 2, are not shown in FIG. 10 for the sake of clarity.

While specific embodiments of apparatuses constructed in accordance with the present invention are described above, it is to be understood that the described embodiments are only illustrative examples and do not limit the spirit and scope of the invention. The scope of the invention is defined by the appended claims.

what is claimed is:

1. The method of eliminating upstanding and floating aquatic growths from a body of water comprising the steps of moving upstanding and floating growths generally downward to a zone adjacent to their root structure while allowing water in which the growths float to pass substantially free of downward movement by contacting upstanding and floating growths with a downwardly moving open mesh belt, cutting the growths into short pieces in said zone by bringing the growths in said zone into contact with a moving cutter in a housing in the zone to advance still upstanding growths and those brought into said zone by the moving step using the downwardly moving mesh belt into an entry in the housing, and thence removing hydraulically the growths which have been cut into small pieces and their roots from said zone via conduit means.

2. The method of claim 1, including the further step of subjecting the cut growths and roots to a vacuum to remove entrained air and growth juices therein.

3. The method as defined in claim 2, including the further step of re-cutting the growths and roots into smaller pieces.

4. The method as defined in claim 2, including the further step of re-cutting the growths and roots under pressure.

5. The method as defined in claim 2, including the further step of spreading the process growths and roots in the form of a blanket back on the bottom of the body of water.

6. The method as defined in claim 2, including the further step of delivering the processed growths and roots to a point remote from the area from which they were originally removed.

* * * * *